US00RE35548E

United States Patent [19]

Sluyterman et al.

[11] E Patent Number: Re. 35,548

[45] Reissued Date of Patent: Jul. 1, 1997

[54] COLOR DISPLAY TUBE SYSTEM WITH REDUCED SPOT GROWTH

[75] Inventors: Albertus A. S. Sluyterman; Lambert J. Stil; Marinus L. A. Vrinten, all of Eindhoven, Netherlands

[73] Assignee: U.S. Philips Corporation, New York, N.Y.

[21] Appl. No.: 26,147

[22] Filed: Feb. 25, 1993

Related U.S. Patent Documents

Reissue of:

[64] Patent No.: 5,027,042
Issued: Jun. 25, 1991
Appl. No.: 591,344
Filed: Oct. 1, 1990

[30] Foreign Application Priority Data

Oct. 2, 1989 [NL] Netherlands ..... 8902436
Aug. 24, 1990 [NL] Netherlands ..... 9001868

[51] Int. Cl.[6] ..... G09G 1/28; H01J 29/70

[52] U.S. Cl. ..... 315/368.28; 313/412

[58] Field of Search ..... 313/412; 315/368.25, 315/368.26, 368.27, 368.28

[56] References Cited

U.S. PATENT DOCUMENTS 2,923,844 2/1960 Gundert .
3,035,198 5/1962 Skoyles .
3,430,099 2/1969 Ashley .
3,440,483 4/1969 Kaashoek et al. .

(List continued on next page.)

FOREIGN PATENT DOCUMENTS

0315269A1 10/1988 European Pat. Off. .
69-09887 3/1970 Netherlands .
69-10495 9/1971 Netherlands .
964066 7/1964 United Kingdom .

OTHER PUBLICATIONS

An article entitled: "The correction of deflection astigmatism is microspot cathode ray tubes", by S.S. Willder, dated 1971.

A book entitled: "Electron And Ion Optics", publ. 1988, by M. Szilagyi, pp. 468–475.

Article entitled: "32" High–Brightness Color Display For HDTV, by Ohsawa et al., SID Symposium, dated Dec. 8, 1989.

(List continued on next page.)

*Primary Examiner*—Thomas H. Tarcza
*Attorney, Agent, or Firm*—Robert J. Kraus

[57] ABSTRACT

A color display tube system comprising an electron gun for producing three co-planar electron beams, and including a main deflection system which in operation generates deflection fields of the self-convergent type, and an auxiliary deflection system which in operation generates a 45° magnetic 4-pole field facing the electron gun and moving the outer electron beams away from each other, and a 45° magnetic 4-pole field facing the display screen and moving the outer beams towards each other.

9 Claims, 4 Drawing Sheets

U.S. PATENT DOCUMENTS

| | | |
|---|---|---|
| 3,553,523 | 1/1971 | Budd . |
| 3,562,683 | 2/1971 | De Santis et al. . |
| 3,793,554 | 2/1974 | Rossaert . |
| 3,851,215 | 11/1974 | Dekeijser et al. . |
| 4,088,930 | 5/1978 | Barten . |
| 4,217,566 | 8/1980 | Hamano et al. . |
| 4,227,122 | 10/1980 | Fujisawa et al. . |
| 4,318,032 | 3/1982 | Kureha . |
| 4,547,707 | 10/1985 | Yabase . |
| 4,556,857 | 12/1985 | Logan . |
| 4,642,527 | 2/1987 | Takahashi et al. . |
| 4,683,405 | 7/1987 | Truskalo et al. . |
| 4,725,763 | 2/1988 | Okuyama et al. . |
| 4,730,216 | 3/1988 | Casey et al. . |
| 4,845,401 | 7/1989 | Shimoma et al. . |
| 4,864,195 | 9/1989 | Masterton . |
| 4,900,979 | 2/1990 | Shimoma et al. . |
| 5,086,259 | 2/1992 | Sakurai et al. . |

OTHER PUBLICATIONS

RCA 85,636 entitled: "A Deflection Sys. with a Controlled Beam Spot", by Grote, Johnson & Bechis.

Article entitled: "Trends of '88 Color TV Line (V)", publ. in Gijutsu, Japanese publ., dated 1988.

Article entitled: "A New Picture Tube System With Homogeneous Spot Performance by Gerritsen et al., publ. in Japan Display" '89, pp. 458–461.

Article entitled: "Deflection Yoke For Trinitron 20×20 In. Color CRT", by Murate et al., SID 89 Digest, pp. 49–52.

"An Improved Micro–Spot Cathode–Ray Tube", C.B. Brooks, P.G. Davey and S.S. Willder, pp. 346–350.

"Analysis of Bubble Chamber Data", A.H. Rosenfeld and W.E. Humphrey, pp. 103–144.

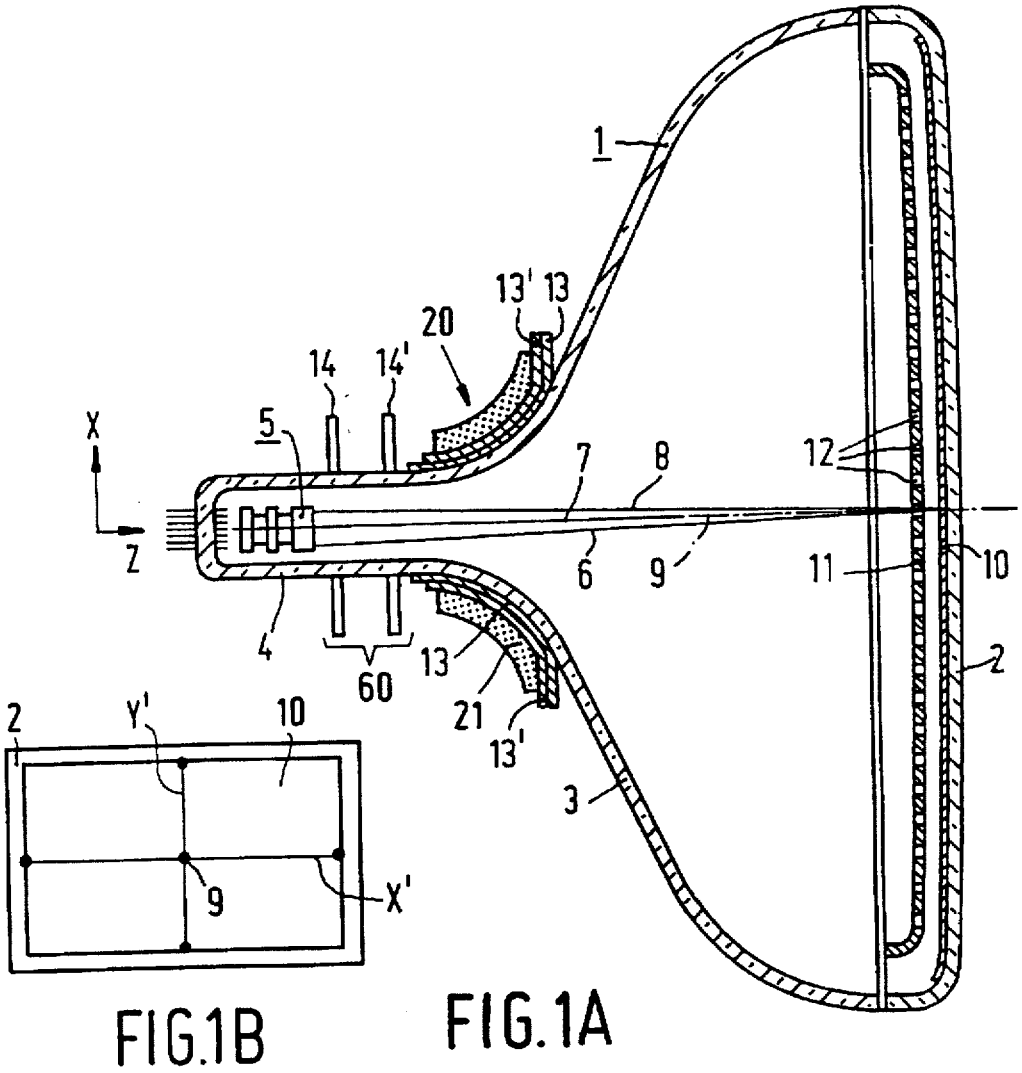
FIG.1B
FIG.1A
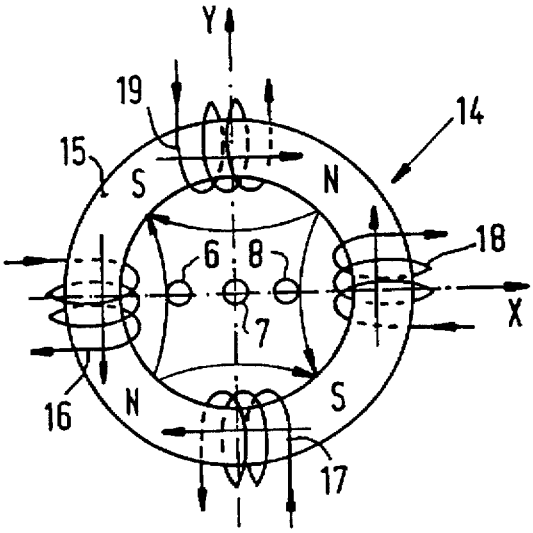
FIG.2A
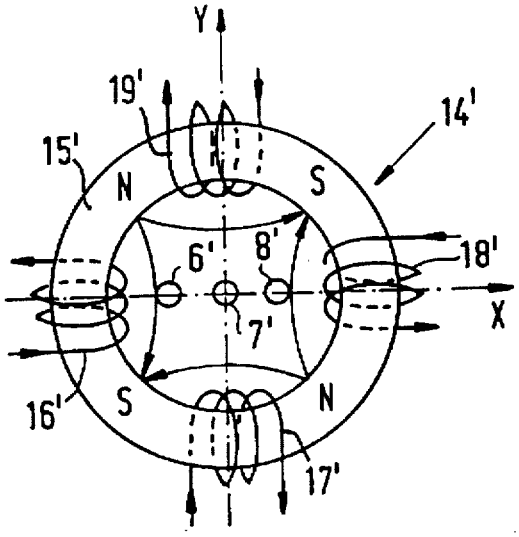
FIG.2B

COLOR DISPLAY TUBE SYSTEM WITH REDUCED SPOT GROWTH

Matter enclosed in heavy brackets [ ] appears in the original patent but forms no part of this reissue specification; matter printed in italics indicates the additions made by reissue.

BACKGROUND OF THE INVENTION

The invention relates to a colour display tube system comprising (a) an evacuated envelope having a neck, a cone and a display window, (b) an electron gun in the neck, which gun has a beam-forming part for generating a central electron beam and two outer electron beams whose axes are co-planar, and a first and a second electrode system which in operation jointly constitute a main lens and are connectable to means for supplying an energizing voltage, and (c) a deflection unit for generating deflection fields for deflecting the electron beams in the horizontal and vertical directions and for scanning the display window by means of convergent beams.

Colour display tube systems of the type described in the opening paragraph are of the conventional 3-in-line type. They generally comprise self-convergent deflection units which in operation generate non-uniform magnetic fields for horizontal and vertical deflection (particularly a barrel-shaped field for the vertical deflection and a pincushion-shaped field for the horizontal deflection) so that the three electron beams generated by the electron gun and focused on the display screen by the main lens converge throughout the display window.

However, these self-convergent fields cause the horizontal spot growth to increase by a given factor in the case of deflection, which factor may be more than two in 110° colour display tube system. This notably means that in a normal self-convergent system, in which the three guns are located in a horizontal plane, a circular central spot becomes flat in the vertical direction and very elongate in the horizontal direction, particularly when using a DAF gun and when scanning the screen. As a result a loss of resolution occurs in the horizontal direction and there is a risk of Moiré problems owing to the spot becoming flatter and the existence of horizontal dams in the shadow mask. The increasingly stricter requirements imposed on the definition of the image, notably in high-resolution colour display tubes or when using colour display tubes for high-definition television, imply that the spot at the ends of the horizontal axis should be smaller in the horizontal direction.

SUMMARY OF THE INVENTION

It is one of the objects of the invention to provide a colour display tube of the type described in the opening paragraph in which the spot at the ends of the horizontal display screen axis is reduced in the horizontal direction (and in which the vertical spot dimension is preferably enlarged).

To achieve this object, a colour display tube according to the invention is characterized in that a first element influencing convergence is arranged between the beam-forming part of the electron gun and the side of the deflection unit facing the display window, which element generates a magnetic field exerting a force on each outer electron beam having a component in the plane of the electron beams directed towards the central electron beam, and in that a second element influencing convergence is arranged between the first element influencing convergence and the beam-forming part of the electron gun, which element generates a magnetic field exerting a force on each outer electron beam having a component in the plane of the electron beams directed away from the central electron beam.

The invention is based on the following recognition. Due to the two elements influencing convergence the outer electron beams are, in operation, subjected to a force which initially drives these electron beams apart (underconvergence) and then bends them towards each other (overconvergence). The two effects introduced by the invention, in the case of deflection, on the convergence of the electron beams substantially compensate each other. The object of the invention is achieved in that the apex angle of each outer electron beam is separately enlarged in the horizontal direction (i.e. in a direction parallel to the plane of the non-deflected beams), which results in a reduction of the spot in the horizontal direction. The apex angle is understood to mean the angle between the outer electron paths of one beam.

The magnetic fields to be generated for the desired effects on convergence may comprise local dipole fields at the location of each of the two outer beams.

For an improved focusing possibility of the electron beams a preferred embodiment of the invention is, however, characterized in that each element influencing convergence is adapted to generate a 45° magnetic 4-pole field. The extent of underconvergence and overconvergence caused by the two elements influencing convergence can be adjusted in such a way that a desired reduced spot dimension is realised in the horizontal direction at the ends of the horizontal display screen axis. The spot in the centre is then also reduced. Since the effect of spot growth in the horizontal direction, inherent in the use of self-convergent fields, is not substantially reduced, the spot in the centre will be smaller than the spot at the ends of the horizontal display screen axis. The invention is based inter alia on the recognition that this is no drawback: the spot can never become too small in the horizontal direction because the bandwidth of the video amplifier will then become the restrictive factor.

The magnetic fields in question may be substantially constant in time. In this case they may be generated, for example, by means of an arrangement of permanent magnets or by means of a configuration of electric coils which are energized with a (substantially constant) direct current. It is alternatively possible to energize the configuration of electric coils with a DC signal whose value only depends on the amplitude of the line deflection signal. Only a simple circuit is required in the two last-mentioned cases and no circuit at all is required in the first-mentioned case.

In the special case of using 45° 4-pole fields the apex angles of the outer beams are enlarged in the horizontal direction, with the above-described effect of reducing the horizontal spot enlargement factor, but simultaneously the apex angles of the outer beams are reduced in the vertical direction so that the vertical spot dimension increases. Using 4-pole fields which are constant in time may result in a too large vertical dimension of the spot in the centre.

One way to prevent this risk is dynamic control of the configurations of coils generating the 4-pole fields such that the vertical dimension of the spot in the centre is sufficiently small. To achieve this, the means for producing the 45° 4-pole fields may be fed, in operation, for example with currents which are approximately proportional to the square value of the line deflection current (i.e. the means for generating the 45° 4-pole fields can be energized by means of a line-parabolic voltage). This can be realised by means of a simple circuit, as will be further described. The currents should be applied in such a way that the generated 4-pole fields have an opposed orientation.

It can be ensured with the aid of the afore-described means that the spot in the horizontal direction at the ends of the horizontal display screen axis is very small in a colour display tube using self-convergent deflection fields.

However, a second drawback of using self-convergent fields is that there is vertical overfocusing when deflecting the electron beams across the display screen. This cannot always be tolerated for applications in which increasingly stricter requirements are imposed on the definition, for example, in high-resolution colour monitors. In these cases it is advantageous to combine the elements according to the invention causing underconvergence and overconvergence with an electron gun which is provided with a (magnetic or electric) quadrupole field lens controlled by means of a static or dynamic voltage for compensating the astigmatic defocusing.

It the magnetic fields used for influencing convergence are generated by means of two configurations of electric coils, each coil may be wound on an annular core coaxially surrounding the neck of the tube. This requires a relatively long tube neck. The tube neck may be shorter if the screen-sided configuration of electric coils is arranged on the annular core of the deflection unit itself.

BRIEF DESCRIPTION OF THE DRAWING

Some embodiments of the invention will now be described in greater detail by way of example with reference to the drawing figures in which:

FIG. 1A is a longitudinal section of a colour display tube system according to the invention, including a system with two elements 14, 14' influencing convergence;

FIG. 1B is an elevational view of a display screen:

FIGS. 1A and 1B are elevational views of elements 14 and 14' for influencing convergence each implemented as a 45° 4-pole element of the colour display tube system of FIG. 1;

Where applicable, identical reference numerals are used for identical components.

DESCRIPTION OF THE PREFERRED EMBODIMENTS

Figure 3:
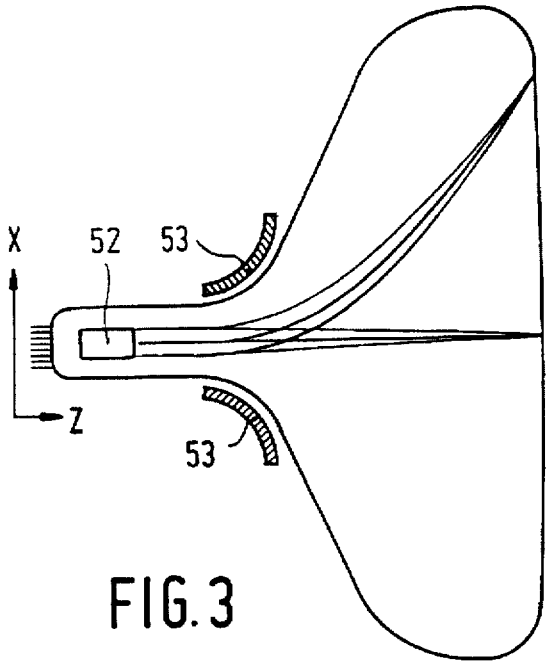
FIGS. 3 and 4 are diagrammatic cross-sections of colour display tube systems illustrating some aspects of the invention.

FIG. 1 is a cross-section of a colour display tube system according to the invention. A glass envelope 1, which is composed of a display window 2, a cone 3 and a neck 4, accomodates an electron gun 5 in this neck, which gun generates three electron beams 6, 7 and 8 whose axes are located in the plane of the drawing. In the non-deflected state, the axis of the central electron beam 7 coincides with the tube axis 9. The display window 2 has a large number of triplets of phosphor elements on its inner side. The elements may consist of, for example, rows or dots. The relevant embodiment shows row-shaped elements. Each triplet comprises a row of a green luminescing phosphor, a row of a blue luminescing phosphor and a row of a red luminescing phosphor. The phosphor rows are perpendicular to the plane of the drawing. A shadow mask 11 is arranged in front of the display screen, which mask has a large number of elongate apertures 12 through which the electron beams 6, 7 and 8 pass and each impinge upon phosphor rows of one colour only. The three co-planar electron beams are deflected by a deflection unit 20 comprising a system 13 of line deflection coils and a system 13' of two diametrical field deflection coils, as well as an annular core 21 coaxially surrounding at least the system 13 of line deflection coils.

Characteristic of the invention is the generation of a first, gun-sided magnetic field configuration which drives the electron beams 6 and 8 apart in the plane of the electron beams, and a second, screen-sided magnetic field configuration which drives the electron beams 6 and 8 towards each other in the plane of the electron beams, all this in such a manner that the spot is small enough in the horizontal direction at the ends of the horizontal display screen axis X' (see FIG. 1B), while maintaining convergence.

The magnetic field configurations to be used may comprise local dipole fields, generated by means of permanent magnets or by configurations of coils at the location of the outer beams 6 and 8. Magnetic pole shoes (not shown) may be arranged in the tube neck 4 so as to guide the dipole fields to the correct locations. A drawback of using (metallic) pole shoes is, however, that eddy currents may occur in them when using high-frequency line deflection fields.

The use of pole shoes may be dispensed with if each magnetic field configuration to be used comprises a 45° 4-pole field. These 4-pole fields may be generated, for example, by means of systems of permanent magnets. It is alternatively possible to generate these fields by means of elements 14 and 14' (see also FIGS. 2A and 2B) which comprise suitable configurations of electric coils.

Figure 6:
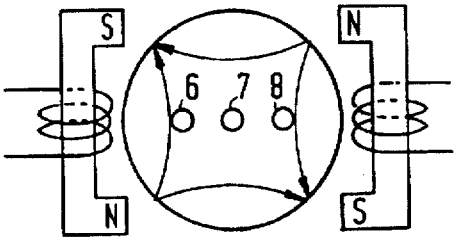
FIGS. 6 and 7 are elevational views of alternative embodiments of 45° magnetic 4-pole elements.
Figure 7:
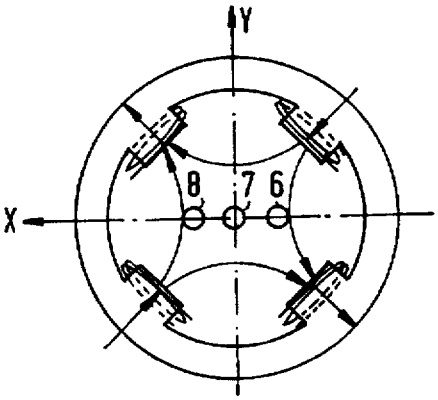

In the embodiment shown element 14 (FIG. 2A) comprises an annular core 15 of a magnetizable material which coaxially surrounds the tube neck (4) and on which four coils 16, 17, 18 and 19 are wound in such a way that a 45° 4-pole field having the orientation shown with respect to the three beams 6, 7 and 8 is generated upon energization. (A 45° 4-pole field may be generated in an alternative way by means of two wound C cores as shown in FIG. 6, or by means of a stator construction as shown in FIG. 7). Element 14' (FIG. 2B) has a construction with an annular core 15' and coils 16', 17', 18' and 19', comparable with the construction of element 14. The coils are, however, wound in such a way and the direction in which, in operation, a current flows through the coils is such that a 45° 4-pole field is generated with an orientation which is opposed to that of the 45° 4-pole field in FIG. 2A.

The embodiment shown in FIG. 1 and FIGS. 2A and 2B comprises a (self-convergent) main deflection unit and an auxiliary deflection unit 60 having two coil configurations each generating a 4-pole field, which unit is arranged in front of the main deflection unit. A circuit for driving the coil configurations generating 4-pole fields may be arranged on the deflection unit 20.

Figure 10:
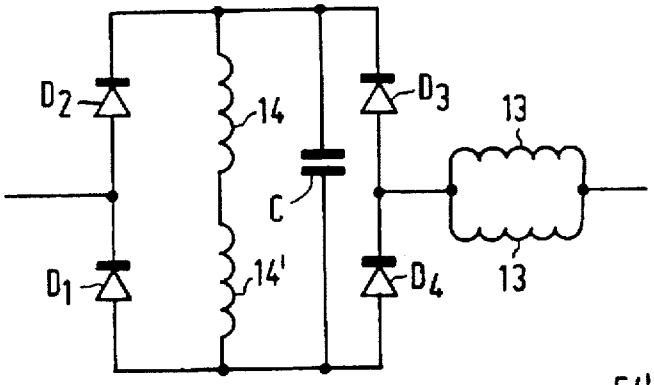
FIG. 10 shows an example of an alternative circuit for connecting the elements 14 and 14' influencing convergence.

For energizing the coil configurations of the elements 14 and 14' it is possible to use direct currents which are not coupled in any way to the line deflection signal, or direct currents whose amplitude is coupled to the amplitude of the line deflection signal. A circuit for realising the last-mentioned possibility is shown in FIG. 10 in which the line deflection coils 13, the coils of element 14, the coils of element 14', four diodes by $D_1$, $D_2$, $D_3$ and $D_4$, respectively, and a capacitor C are shown schematically.

The use of the colour display tube system according to the invention is particularly suitable in high resolution monitors and in future HDTV apparatuses, particularly in those cases where the aspect ratio of the display screen is larger than 4:3, notably 16:9.

Figure 4:
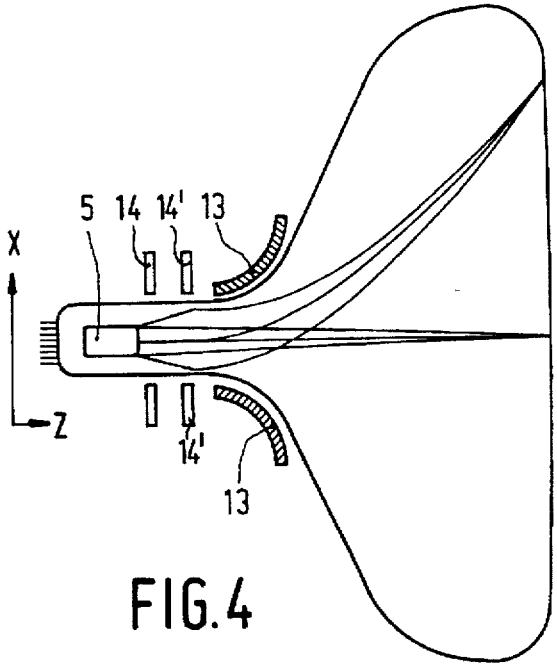

The recognition on which the invention is based will be further described with reference to FIGS. 3 and 4 showing diagrammatic cross-sections of colour display tubes. FIG. 3 shows a state of the art colour display tube with an electron gun 52 and a self-convergent system 53 of deflection coils. The electron beams converge throughout the display window.

FIG. 4 shows the principle of a colour display tube system according to the invention with a system 13 of line deflection coils. The underconvergence induced by an element 14 influencing convergence and moving the outer beams away from each other, and the overconvergence induced by a subsequent element 14' influencing convergence compensate each other so that the self-convergence is maintained. As a result, the spot dimension in the horizontal direction at the ends of the horizontal display screen axis is reduced with respect to that occurring in the system of FIG. 3. A further advantage is that the spot shape may be more homogeneous (more circular). In the known state of the art, the horizontal dimension of the spot at the edges of the display screen is considerably larger than the vertical dimension. A more homogeneous spot shape is desired, particularly for data displays.

Figure 5:
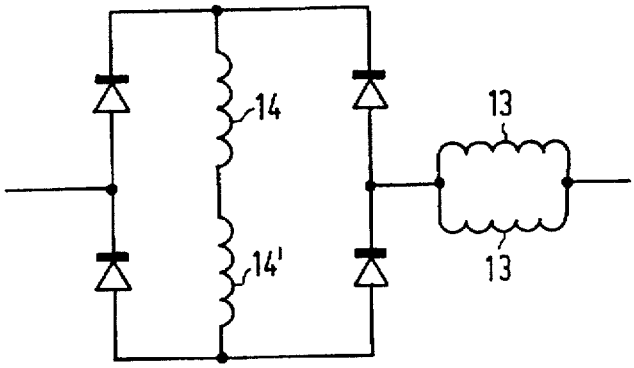
FIG. 5 shows an example of connecting the elements 14 and 14' in an electric circuit.

One way to achieve this is dynamic control of the configurations of the coils generating 4-pole fields such that the vertical dimension of the spot in the centre is sufficiently small. To achieve this, the means for producing the 45° 4-pole fields may be fed, in operation, for example with currents which are a substantially quadratic function of the line deflection current (i.e. the means for generating the 45° 4-pole fields can be energized means of a line-parabolic voltage). This can be realised by means of the circuit shown in FIG. 5, as will be further described. The currents should be applied in such a way that the generated 4-pole fields have an opposed orientation. The function which the above-mentioned line parabola represents may have its minimum value on the zero line. In those cases where the spot dimension in the x-direction at the ends of the horizontal axis is sufficiently small, but not in the y-direction, the dimension in the y-direction can be realised satisfactorily by putting the minimum value of the above-mentioned function below the zero line.

It can be ensured with the aid of the afore-described means that the spot is very small in a colour display tube using self-convergent deflection fields. For high-resolution applications the spot should not only be small but it should also remain in focus as much as possible when it is deflected across the screen. To realise this, the means according to the invention can be combined with an electron gun having a static, or particularly dynamic astigmatic focusing facility. An example of such a gun is a so-called DAF gun.

The principle of an electron gun using D(ynamic) A(stigmatic) F(ocus) will be described in greater detail with reference to FIG. 6.

Figure 8:
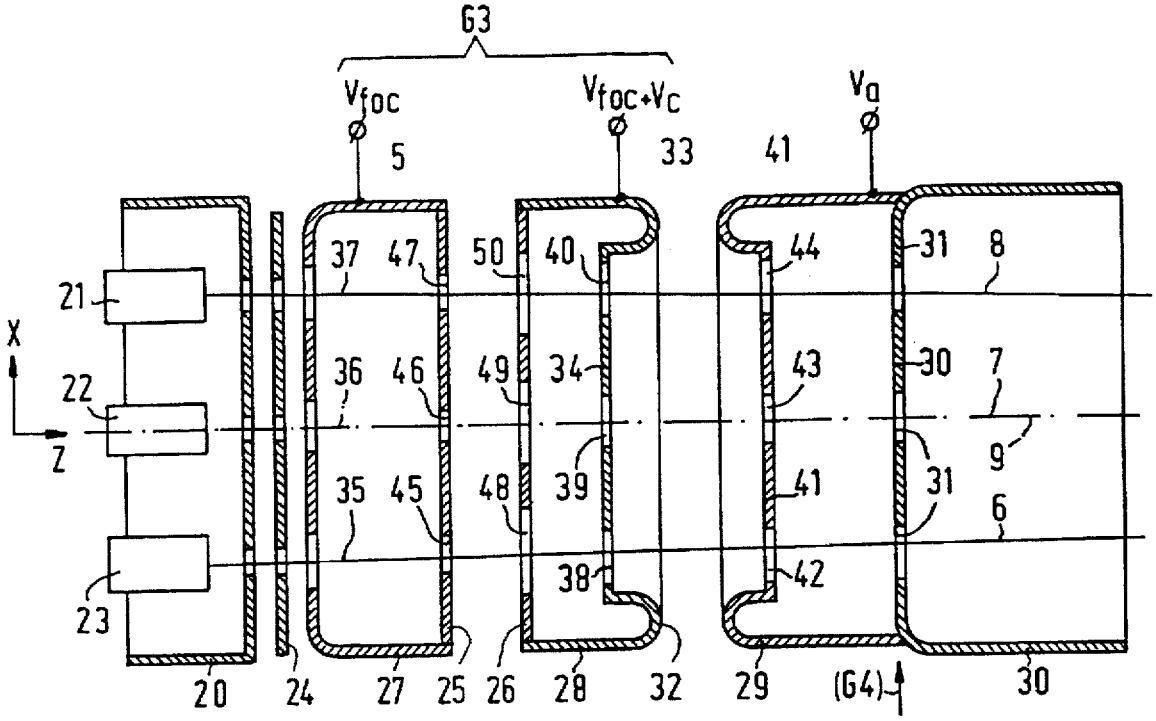
FIG. 8 is a longitudinal section of an electron gun of the DAF type suitable for a colour display tube system according to the invention.

For the purpose of illustration, FIG. 8 is a longitudinal section of an electron gun suitable for use in a colour display tube system according to the invention. This electron gun comprises a common cup-shaped electrode 20 in which three cathodes 21, 21 and 23 are secured, and a common plate-shaped screen grid 24. The three electron beams whose axes are co-planar are focused by means of the electrode systems (G3) and (G4) which are common for the three electron beams. Electrode system G3 comprises two cup-shaped parts 27 and 28 whose ends face each other. A main lens is constituted by applying suitable voltages to the first electrode system G3 and the second electrode system, or anode G4.

Electrode system G4 has one cup-shaped part 29 adjoining G3 and a centring bush 30 whose bottom has apertures 31 through which the electron beams pass. Electrode part 28 has an outer edge 32 extending towards electrode part 19 and electrode part 29 has an outer edge 33 extending towards electrode part 28. A recessed portion 34, which extends transversely to the plane through the axes 35, 36 and 37 of the electron beams 6, 7 and 8, has apertures 38, 39 and 40. A recessed portion 41, which extends parallel to recessed portion 34, has apertures 42, 43 and 44. The recessed portions 34 and 41 form one assembly with the electrode parts 28 and 29, respectively. For obtaining desired focusing fields, the apertures in the recessed portions may be, for example, circular or provided with collars, or they may be polygonal and without collars. In the latter case a polygonal gun is concerned.

In this embodiment an astigmatic element is formed in electrode system G3 by providing the open ends of the parts 27 and 28 with auxiliary electrodes 25, 26 in the form of fat plates having elongate (vertical) apertures 45, 46 and 47 and elongate (horizontal) apertures 48, 49 and 50, respectively. The apertures may have any shape leading to the formation of a 4-pole field for the electron beams passing through the apertures, for example, a rectangular, an oval or a diamond shape.

In operation, electrode 27 can be coupled to means, which are not shown in this Figure, for applying a constant focusing voltage $V_{foc}$. In this embodiment electrode 28 can be coupled to means for applying a control voltage $V_{foc}+V_C$.

Figure 9:
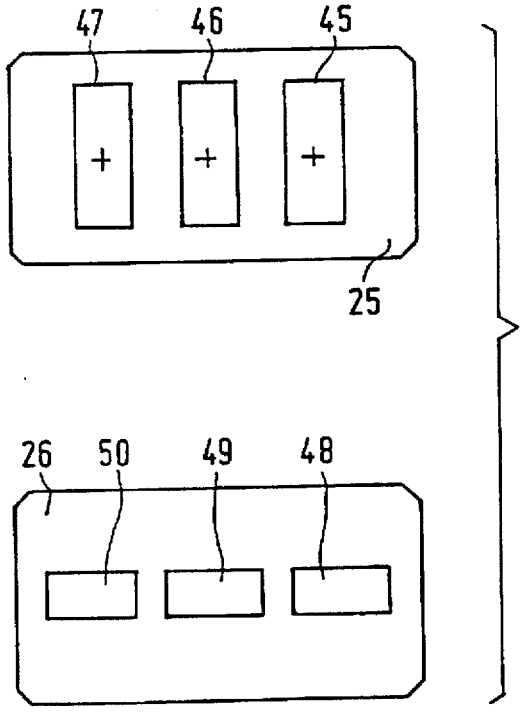
FIG. 9 is a elevation of two auxiliary electrodes in the electron gun of FIG. 8.

FIG. 9 shows the auxiliary electrodes 25 and 26 of the electrode system of FIG. 8 in a front elevation. The axes of the electron beams 6, 7 and 8 are shown in this Figure by means of crosses and substantially coincide with the centres of gravity of the (vertical) apertures 45, 46 and 47. The centres of the 4-poles formed in the apertures substantially coincide with the beam axes. The auxiliary electrodes may alternatively comprise two parallel electrode plates, one of which has three substantially vertical apertures and the other has one substantially horizontal, elongate aperture.

The embodiment shown should not be considered as limitative. For example, only one auxiliary electrode, controlled by $V_{foc}$, may be arranged between the electrode parts 27 and 28, with a control voltage $V_{foc}+V_C$ being applied to the two electrodes 27 and 28. More generally, any type of electron gun having a static or dynamic astigmatic focus can be used within the scope of the invention.

Figure 11:
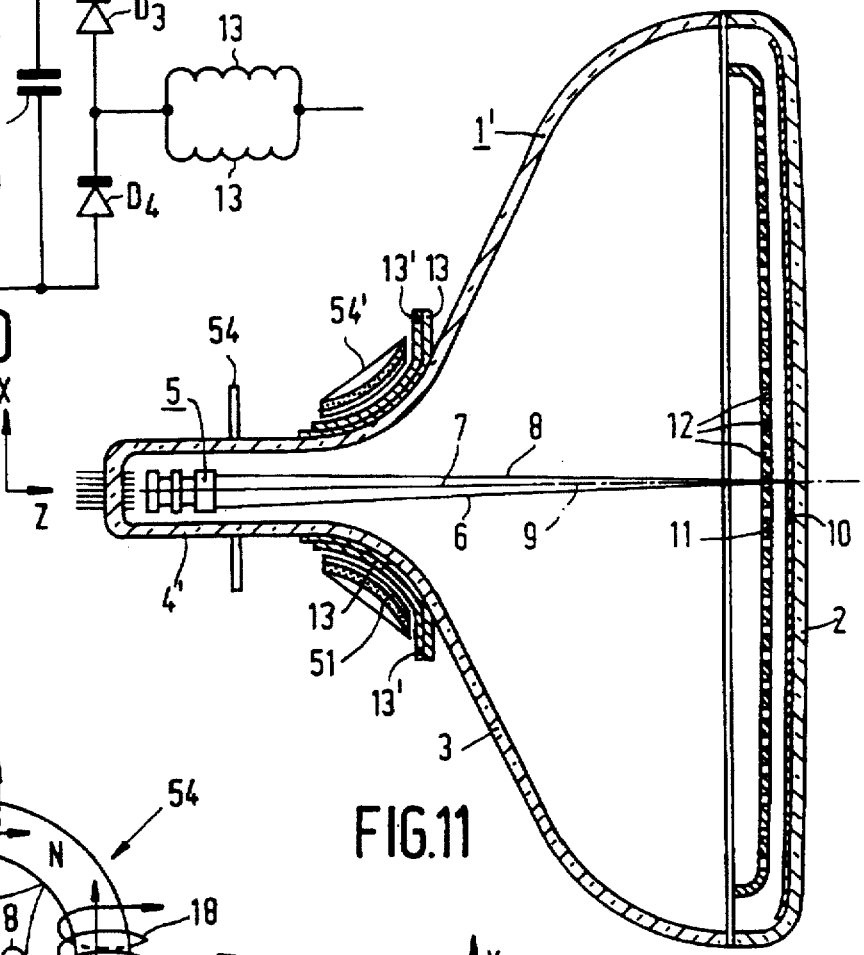
FIG. 11 is a longitudinal section of a colour display tube system including elements 54 and 54' influencing convergence.
Figure 12A:
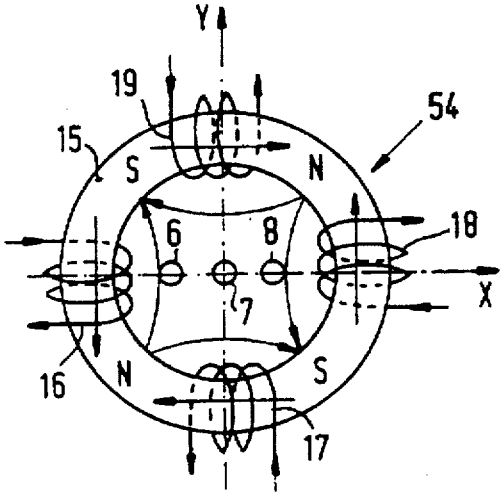
FIG. 12A is a front elevation of the element 54.
Figure 12B:
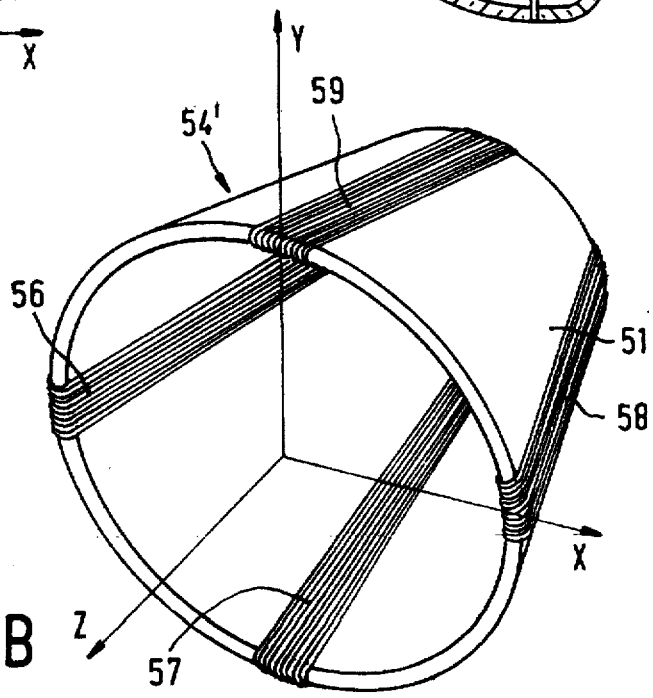
FIG. 12B is a perspective elevational view of the element 54'.

FIG. 11 shows an alternative embodiment of a colour display tube system according to the invention. In this embodiment the tube has a gun-sided element 54 influencing convergence for driving apart the outer electron beams of the type having its own annular core which is shown in FIG. 12A. In this embodiment the screen-sided element 54' influencing convergence for driving the outer beams towards each other comprises a coil configuration which is arranged on the annular core 51 of the deflection unit. FIG. 12B shows the annular core 51 of the deflection unit with coil configuration 56, 57, 58 and 59, which is connectable to a voltage source in such a way that a 4-pole field having an orientation for driving the outer beams towards each other is generated. In this case the neck 4' of the colour display tube system 1' may be shorter than the neck 4 of the system 1 in FIG. 1A.

We claim:

1. A colour display tube system comprising (a) an evacuated envelope having a neck, a cone and a display window, (b) an electron gun in the neck, which gun has a beam-forming part for generating a central electron beam and first and second outer electron beams whose axes are co-planar, and a first and a second electrode system which in operation jointly constitute a main lens and are connectable to means for supplying an energizing voltage, and (c) a deflection unit for generating first and second deflection fields for deflecting the electron beams in the horizontal and vertical directions and for scanning the display window by means of convergent beams, characterized in that a first convergence influencing element is arranged between the beam-forming part of the electron gun and a side of the deflection unit facing the display window for generating a magnetic field exerting a force on each outer electron beam having a component in the plane of the electron beams directed towards the central electron beam, and in that a second convergence influencing element is arranged between the first convergence influencing element and the beam-forming part of the electron gun for generating a magnetic field exerting a force on each outer electron beam having a component in the plane of the electron beams directed away from the central electron beam.

2. A colour display tube system as claimed in claim 1, characterized in that each element influencing convergence is adapted to generate a 45° magnetic 4-pole field.

3. A colour display tube system as claimed in claim 1 or 2, characterized in that a direct current is used for generating the magnetic fields.

4. A colour display tube system as claimed in claim 1 or 2, characterized in that it has means for dynamically varying the strength of the magnetic fields generated by the convergence influencing elements with the strength of the first deflection field.

5. A colour display tube system as claimed in claim 4, characterized in that the means for dynamically varying the strength of the magnetic fields generated by the convergence influencing elements with the strength of the first deflection field comprise means for applying a dynamically varying control voltage having a component which varies synchronously with the first deflection field.

6. A colour display tube system as claimed in claim 5, characterized in that the component is parabolic.

7. A colour display tube system as claimed in claim 1 or 2, characterized in that the electron gun comprises means for producing a quadrupole field lens which is energizable for compensating astigmatic defocusing.

8. A colour display tube system as claimed in claim 1 or 2, characterized in that the display tube has a window with an aspect ratio of approximately 9:16.

*9. A deflection apparatus, comprising:*

*a cathode ray tube including an evacuated glass envelope, a display screen disposed at one end of said envelope, and an electron gun assembly disposed at a second end in said envelope, said electron gun assembly, in operation, producing central and first and second outer electron beams that form respective beam spots at electron beam landing locations on said screen;*

*a plurality of deflection windings for producing a main deflection field in a main deflection region of a deflection yoke that deflects the electron beams to said beam landing locations;*

*a first quadrupole arrangement for producing in a first region traversed by said outer electron beams a first quadrupole magnetic field that varies in accordance with said beam landing locations and produces forces acting to diverge said outer electron beams from each other; and*

*a second quadrupole arrangement for producing in a second region traversed by said diverged outer electron beams a second quadrupole magnetic field that varies in accordance with the beam landing locations and produces forces acting to converse said outer electron beams toward each other.*

* * * * *